(12) United States Patent
Kah, Jr.

(10) Patent No.: US 9,766,609 B2
(45) Date of Patent: Sep. 19, 2017

(54) SPRINKLER CONTROLLER WITH DIAL POSITION FOR EACH FUNCTION AND PROGRAM CONTENT DISPLAY POSITION

(76) Inventor: Carl L. C. Kah, Jr., North Palm Beach, FL (US)

( * ) Notice: Subject to any disclaimer, the term of this patent is extended or adjusted under 35 U.S.C. 154(b) by 810 days.

(21) Appl. No.: 13/271,784

(22) Filed: Oct. 12, 2011

(65) Prior Publication Data

US 2012/0029660 A1    Feb. 2, 2012

Related U.S. Application Data

(63) Continuation of application No. 11/496,112, filed on Jul. 31, 2006.

(60) Provisional application No. 60/704,222, filed on Jul. 29, 2005.

(51) Int. Cl.
*G05B 11/01* (2006.01)
*G05B 19/042* (2006.01)

(52) U.S. Cl.
CPC ...... *G05B 19/0423* (2013.01); *G05B 2219/23058* (2013.01); *G05B 2219/23165* (2013.01); *G05B 2219/23167* (2013.01); *G05B 2219/2625* (2013.01)

(58) Field of Classification Search
CPC ........................................ G05B 11/01
USPC ................................... 700/16, 284
See application file for complete search history.

(56) References Cited

U.S. PATENT DOCUMENTS

4,937,746 A * 6/1990 Brundisini ............ 700/284
2006/0184284 A1* 8/2006 Froman et al. ........ 700/284

* cited by examiner

*Primary Examiner* — Tejal Gami
(74) *Attorney, Agent, or Firm* — Ostrolenk Faber LLP

(57) ABSTRACT

A controller for use in an irrigation system includes a selector, an indicator associated with the selector for identifying parameters selected to be set for use in controlling the irrigation system, indicia positioned on a top surface of the controller which cooperate with the selector to indicate the parameter being selected and a display for displaying information regarding the selected parameters; wherein the indicator includes a program display position for displaying information regarding all parameters related to a selected program of operation of the controller.

12 Claims, 1 Drawing Sheet

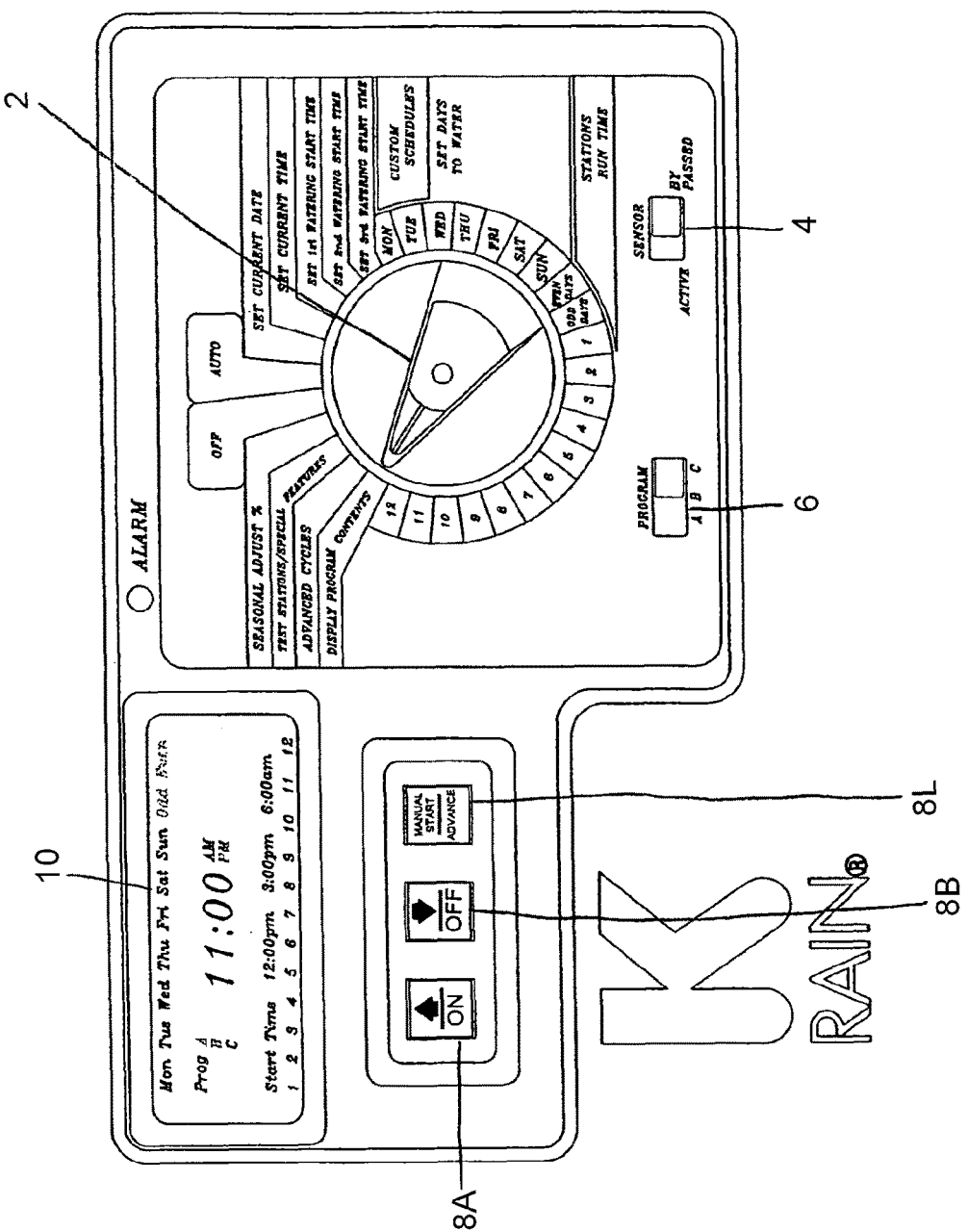

SPRINKLER CONTROLLER WITH DIAL POSITION FOR EACH FUNCTION AND PROGRAM CONTENT DISPLAY POSITION

CROSS REFERENCE TO RELATED APPLICATIONS

The present application is a continuation of U.S. application Ser. No. 11/496,112 entitled SPRINKLER CONTROLLER WITH DIAL POSITION FOR EACH FUNCTION AND PROGRAM CONTENT DISPLAY POSITION filed Jul. 31, 2006 which claims benefit of and priority to U.S. Provisional Patent Application No. 60/704,222 entitled SPRINKLER CONTROLLER WITH DIAL POSITION FOR EACH FUNCTION AND PROGRAM CONTENT DISPLAY POSITION filed Jul. 29, 2005, the entire contents of which are hereby incorporated by reference herein.

BACKGROUND OF THE INVENTION

The present invention relates to a controller for use in controlling an irrigation system. More particularly, the present invention relates to a controller which includes an option of displaying all information regarding a program of operation for the controller at one time on a display of the controller.

DESCRIPTION OF THE ART

Controllers for use in irrigation systems are well known in the art. One common controller includes a dial used to set various parameters to program the controller as desired by the user. These dials typically include positions for selecting each of the sprinklers in the irrigation system, the days of the week, just odd days, just even days, watering start times, and other parameters, if desired. Typically, a display is included on the controller to view the selections made and any other information. However, in these conventional controllers when reviewing the programs it is necessary to step through switch positions to view the selections made and the overall program. Thus, in the existing controller, if a user wants to confirm or later find what a particular program is running, the user must step through each position of the rotary switch to determine if that station runs etc.

SUMMARY OF THE INVENTION

It is an object of the present invention to provide a controller for an irrigation system that avoids the problems noted above.

A controller for use in an irrigation system in accordance with an embodiment of the present application includes a selector, an indicator associated with the selector for identifying parameters selected to be set for use in controlling the irrigation system, indicia positioned on a top surface of the controller which cooperate with the selector to indicate the parameter being selected and a display for displaying information regarding the selected parameters; wherein the indicator includes a program display position for displaying information regarding all parameters related to a selected program of operation of the controller.

Other features and advantages of the present invention will become apparent from the following description of the invention which refers to the accompanying drawings.

BRIEF DESCRIPTION OF THE DRAWING(S)

FIG. 1 illustrates the controller face of a controller in accordance with an embodiment of the present application.

DETAILED DESCRIPTION OF PREFERRED EMBODIMENTS OF THE INVENTION

A controller 1 in accordance with an embodiment of the present invention is illustrated in FIG. 1. The controller 1 preferably includes a selector 2, such as a rotary switch and dial illustrated in FIG. 1, for selecting the various parameters controlled by the controller. While the selector 2 is embodied as a rotary switch and dial in FIG. 1, any appropriate selector may be used. As illustrated, the selector 2 includes positions to set the days of the week, start times, only even days, only odd days, an off position and an auto position similar to a conventional controller. In addition a switch 4 is provided to enable or disable an input form a rain sensor, as desired. The use of rain sensors in conjunction with controllers for irrigation systems is well known and thus need not be described in further detail herein.

A second switch 6 is preferably included to select a program for controlling the irrigation system. As illustrated, the switch 6 allows the selection of one of three preprogrammed watering schedules or programs, A, B, and C, however, it should be understood that fewer or more programs may be used and the switch 6 may be modified accordingly. For example, a rotary switch and dial could be used.

The controller 1 also includes three buttons, 8a, 8b, and 8c which are used to input instructions into the controller 1, preferably in conjunction with the selector 2 and switches 4 and 6 as is well known in the art. Typically, the buttons 8A, 8B, 8C are used to set specific values for the parameters selected using the selector 2.

The controller 1 of the present application also includes a program display position indicated in FIG. 1 by the words "Display Program Contents". When the selector 2 is in this position, the controller 1 will display on the display panel 10 all of the information regarding a selected program. For example, as illustrated, the switch 6 indicates that program C has been selected. The display 10 illustrates the days of the week, the times of day and the valves that are activated by the controller in accordance with program C. Thus, a user can easily see what parameters are set for program C without the need to scroll through each parameter separately as is common in conventional controller.

The controller of FIG. 1 also preferably includes a microprocessor (not shown) that executes the programs that are set in the controller and is connected to the selector 2, the switches 4, 6 and the buttons 8A, 8B, 8C to accept instructions for execution by the controller. The microprocessor is also connected to the display 10 to control the display of information thereon. A memory (not shown) is typically connected to or integrated with the microprocessor and may be used to store the programs A, B and C, and any other desired information. The use of such microprocessors and memory is well known in the art and thus need not be described in further detail herein.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A controller for use in controlling an irrigation system comprises:
 a selector configured to select desired functionality of the controller; and
 a display for displaying information;
 the selector including a program content display position, the program content display position providing for displaying information regarding all parameters related to just a selected program of operation of the controller on the display at the same time.

2. The controller of claim 1, wherein the parameters include days of the week, watering start times, and sprinkler station numbers, where each sprinkler station number is associated with a run time.

3. The controller of claim 1, wherein the selected program of operation includes at least one day of the week, at least one start time and at least one sprinkler station number to be activated by the controller in accordance with the selected program of operation, the day of the week, start time, sprinkler station zone number and associated run time being necessary to provide irrigation at a sprinkler station indicated by the sprinkler station number.

4. The controller of claim 1, wherein the selected program of operation is one of a plurality of programs of operation executable by the controller.

5. The controller of claim 1, further comprising a switch operable to select the selected program of operation from the plurality of programs of operation.

6. The controller of claim 5, further comprising a plurality of buttons operable to input information into the controller.

7. The controller of claim 6, wherein the plurality of buttons are operable to set specific values for the selected parameter.

8. The controller of claim 7, further comprising a rain sensor switch operable to enable a rain switch input to the controller.

9. The controller of claim 1, wherein the selector is a rotary switch.

10. The controller of claim 1, wherein the selector is a virtual dial.

11. A method of programming an irrigation controller including a selector, an input element and a display, the method comprising:
 selecting a first parameter of a selected irrigation program using the selector;
 entering a first desired value for the first parameter using the input element;
 selecting a second parameter of the selected irrigation program using the selector;
 entering a second desired value for the second parameter using the input element; and
 moving the selector to a program content display position such that the first desired value of the first parameter and the second desired value of the second parameter are displayed on the display at the same time.

12. A controller for use in controlling an irrigation system comprises:
 a selector configured to select desired functionality of the controller, the selector being a rotary switch;
 a display for displaying information;
 a microprocessor connected to the selector and to the display to control operation of at least the display;
 the selector including a program content display position, the program content display position providing input to the microprocessor such that the microprocessor provides control signals to the display for displaying all controller parameters of a selected program of operation of the controller that relate to just the selected program of operation on the display at the same time.

* * * * *